(12) United States Patent
Matsushita

(10) Patent No.: US 9,256,792 B2
(45) Date of Patent: Feb. 9, 2016

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/906,903

(22) Filed: May 31, 2013

(65) Prior Publication Data
US 2013/0322758 A1 Dec. 5, 2013

(30) Foreign Application Priority Data

Jun. 4, 2012 (JP) ................................. 2012-127143

(51) Int. Cl.
G06K 9/18 (2006.01)
G06K 9/72 (2006.01)
(52) U.S. Cl.
CPC .. *G06K 9/18* (2013.01); *G06K 9/72* (2013.01); *G06K 2209/01* (2013.01)
(58) Field of Classification Search
None
See application file for complete search history.

(56) References Cited

FOREIGN PATENT DOCUMENTS

| CN | 101533474 A | * | 9/2009 |
| JP | 2858560 B2 | | 2/1999 |
| JP | 2989364 B2 | | 12/1999 |

OTHER PUBLICATIONS

C.Harris and M.J. Stephens,"A combined corner and edge detector," In Alvey Vision Conference, pp. 147-152, 1988.
David G. Lowe, "Distinctive Image Features from Scale-Invariant Keypoints," International Journal of Computer Vision, Jan. 5, 2004, pp. 1-28.
M. A. Fischler and R. C. Bolles, "Random sample consensus: A paradigm for model fitting with applications to image analysis and automated cartography," Commununications of the ACM, vol. 24, No. 6, pp. 381-395, Jun. 1981.

* cited by examiner

*Primary Examiner* — Stephen R Koziol
*Assistant Examiner* — Amandeep Saini
(74) *Attorney, Agent, or Firm* — Canon USA, Inc. IP Division

(57) ABSTRACT

To make it easier to grasp characters that appear across different images by determining a pair of character area images to be a combination target based on a degree of similarity or a position of each character area image extracted from different images, and connecting and combining overlapping area images that are the determined pair of character area images and that have a similar image feature amount.

18 Claims, 13 Drawing Sheets

FIG.4A
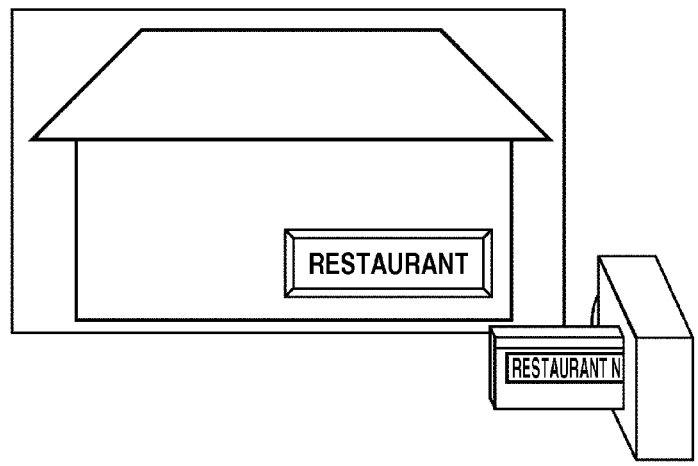
FIG.4B
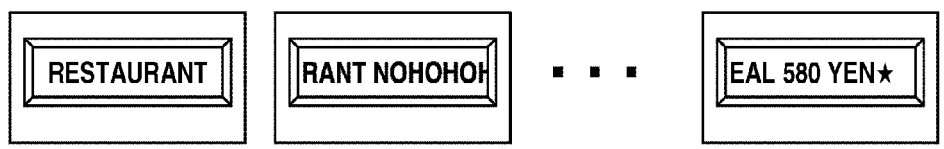
FIG.4C
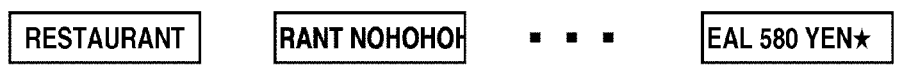
FIG.4D
| RESTAURANT NOHOHOHON ★HONOBONO SET MEAL 580 YEN★ ★TORORIN SET MEAL 680 YEN★ |

IMAGE PROCESSING APPARATUS, IMAGE PROCESSING METHOD, AND PROGRAM

BACKGROUND OF THE INVENTION

1. Field of the Invention

The present invention relates to an image processing apparatus, method, and program for extracting a character string from an image.

2. Description of the Related Art

When a moving image is captured with a digital camera or a digital camcorder, a signboard that has a width or height so long that even an image captured at a wide-angle cannot fit in a single screen is captured while panning or tilting. When capturing an image of an electronic billboard or a display in which characters are scrolled, the camera is fixed so that the characters move across the imaging screen. In addition, on a television broadcast screen, a telop character string scrolls inside the screen. In whichever case, the whole character string does not fit in a single screen, so that in order to grasp the whole character string, a character string that appears over a plurality of frames has to be extracted.

Japanese Patent No. 2989364 discusses a technique for composing a whole image by combining a plurality of images. If the whole image can be obtained, according to the conventional art, character recognition can also be performed from the combined whole image.

Japanese Patent No. 2858560 discusses a technique for capturing a moving image of an object on which characters are written that do not fit on a single screen. In the character recognition, character recognition is performed on each frame image, and those character recognition results are combined.

The invention discussed in Japanese Patent No. 2989364 is effective when capturing an image of a sign having a long width or height while panning or tilting. However, when an image of an electronic billboard or display in which characters are scrolled is captured, a plurality of images is combined to make the backgrounds other than the electronic billboard or the display match. Therefore, regarding the electronic billboard or display content, a plurality of scrolled characters overlaps each other, so that even if the electronic billboard or display content is extracted, the characters cannot be read. Consequently, character recognition is also impossible. Regarding a television broadcast telop, the background image also moves independently of the movement of the telop display portion. Thus, if the backgrounds are matched, similar to an electronic billboard or display, a plurality of scrolled characters overlap each other, and if the telop display portion is extracted, the characters cannot be read. Consequently, character recognition is also impossible.

In addition, if an image is large, a huge amount of calculation time is required to combine the images, and a high-capacity memory is needed to store the whole image generated by the image combination. When character recognition is performed in the whole image, since the whole image is large, a huge amount of calculation time is required to extract the character area to be subjected to the character recognition.

According to the invention discussed in Japanese Patent No. 2858560, the character recognition result of each frame image may vary due to light fluctuation and camera shake. To increase the reliability of those results, errors are corrected by defining a similarity distance between character codes, and a word dictionary is used. If there is a word that is not listed in the dictionary (a new word or a made-up word), the combining process may result in failure. Especially on signboards and electronic billboards, shop names that use phonetic equivalent characters may be displayed, which can cause mistakes in recognition.

SUMMARY OF THE INVENTION

The present invention is directed to an image processing apparatus, a method thereof, and a program, that can efficiently connect and extract character strings even if the character string cannot be extracted from a single image because the characters appear across different images.

According to an aspect of the present invention, an image processing apparatus includes an extraction unit configured to extract a character area image from an image, a determination unit configured to determine a pair of character area images to be a combination target based on a degree of similarity of an image feature in each character area image extracted by the extraction unit from different images, and a combination unit configured to combine the determined pair of character area images to form a combined character area image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4D illustrate an example of a moving image to be a processing target according to an exemplary embodiment of the present invention.

DESCRIPTION OF THE EMBODIMENTS

Various exemplary embodiments, features, and aspects of the invention will be described in detail below with reference to the drawings.

<Image Processing Apparatus Control Configuration>

Figure 1:
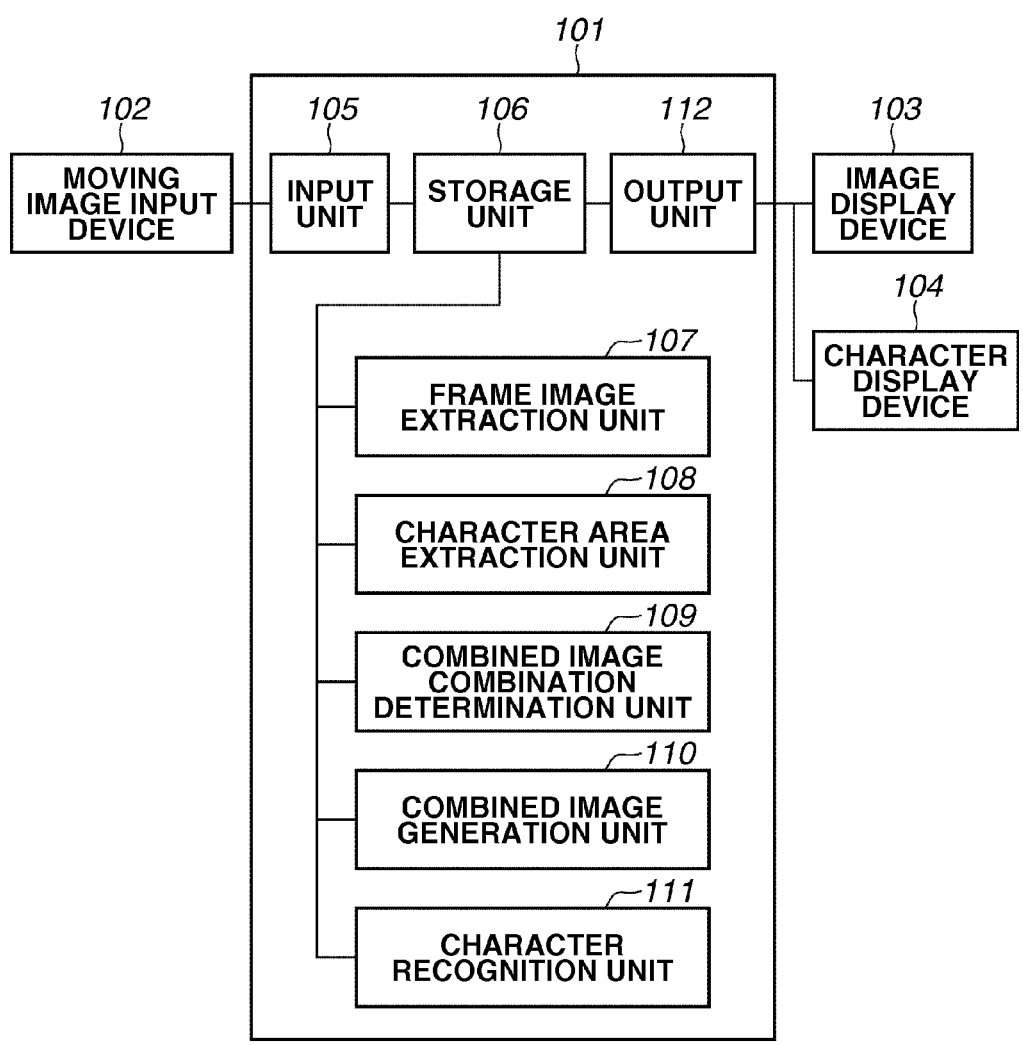
FIG. 1 is a block diagram illustrating a configuration of an image processing apparatus according to an exemplary embodiment of the present invention.

FIG. 1 is a block diagram illustrating a system configuration that includes an image processing apparatus according to a first exemplary embodiment. Operations of respective parts illustrated in FIG. 1 will be described in detail with reference to a flowchart in FIG. 2.

In FIG. 1, an image processing apparatus 101 extracts a character string from a moving image according to the present exemplary embodiment. A moving image input device 102 is, for example, a digital video, a digital camcorder, or a television tuner that inputs moving images. An image display device 103 displays a character string image after character string extraction. A character string display device 104 displays a character recognition result.

In the image processing apparatus 101, an input unit 105 serves as an input interface with the moving image input device 102. A storage unit 106 is a memory/hard disk drive (HDD) that stores the data being processed. A frame image extraction unit 107 extracts a frame image to be a processing target from an input image. A character area extraction unit 108 extracts a character area from the extracted frame image.

A combined image combination determination unit 109 determines a combination of images to be combined when a plurality of character areas is extracted from one frame image. When the images of character areas extracted from different frame images are to be combined, the combined image combination determination unit 109 determines the combination of which character area images should be combined. When an already-combined combined image is to be combined with an image of a character area extracted from a new frame image, the combined image combination determination unit 109 determines the combination of which character area image and which already-combined combined image should be combined.

A combined image generation unit 110 combines images of character areas from different frame images. An image combined by the combined image generation unit 110 is displayed on the image display device 103.

A character recognition unit 111 performs character recognition of a combined image. A character recognized by the character recognition unit 111 is displayed on the character string display device 104.

An output unit 112 serves as an output interface with the image display device 103 and the character string display device 104. The above-described units are controlled in an integrated manner by a central processing unit (CPU) (not illustrated).

The CPU can function as various units by executing a program. A control circuit such as an application-specific integrated circuit (ASIC) that operates in cooperation with the CPU can also function as such units. Further, these functions can also be realized based on cooperation between the CPU and a control circuit configured to control operations of the image processing apparatus. In addition, one CPU may be employed, or a plurality of CPUs may be employed. In this case, the plurality of CPUs can execute processing in a distributed manner. Further, the plurality of CPUs may be arranged in a single computer, or arranged in a plurality of physically different computers. In addition, a unit realized by the CPU executing a program can also be realized by a dedicated circuit.

The image processing performed in the image processing apparatus 101 will be described with reference to the flowchart in FIG. 2. Examples of a moving image as a processing target are illustrated in FIGS. 3A to 3D. Processing to be performed on these examples will be described based on the flow of the flowchart in FIG. 2. The processing illustrated in flowchart is realized by the CPU executing a control program.

Figure 3A:
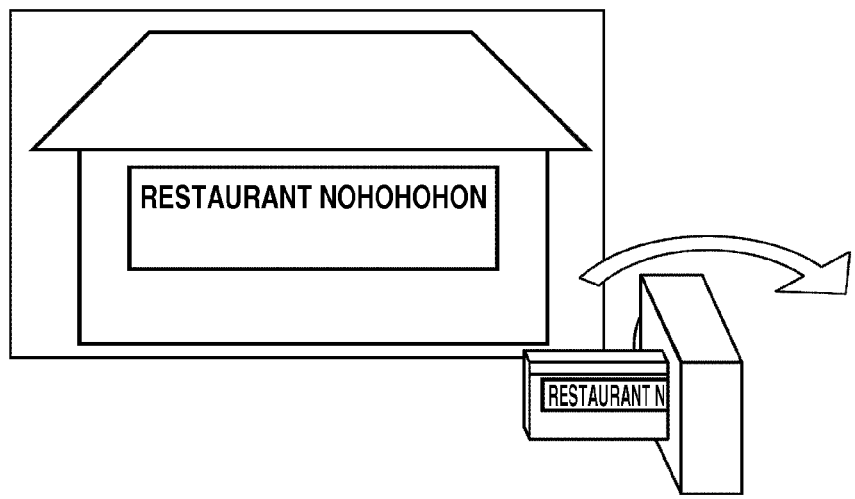
FIGS. 3A to 3D illustrate an example of a moving image to be a processing target according to an exemplary embodiment of the present invention.
Figure 5A:
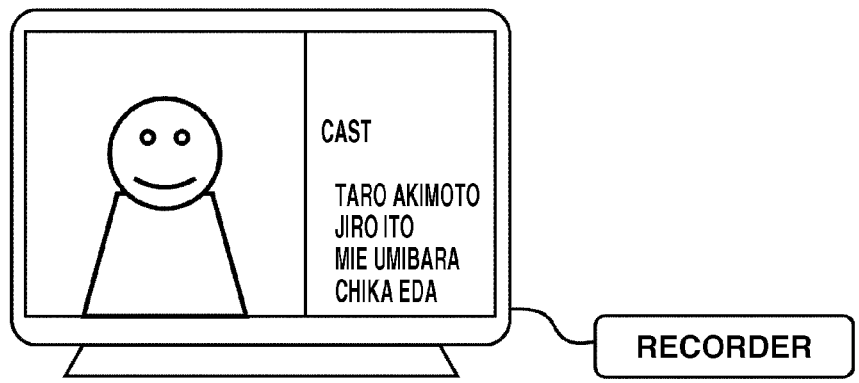
FIGS. 5A to 5D illustrate an example of a moving image to be a processing target according to an exemplary embodiment of the present invention.

FIG. 3A illustrates an example in which an image of a horizontally long signboard is captured while panning the moving image input device 102. FIG. 4A illustrates an example in which an image of an electronic billboard in which a character string scrolls is captured with the moving image input device 102 in a motionless state. FIG. 5A illustrates an example in which an image of a program including a television telop along which a character string scrolls is viewed and recorded.

First, in step S201, a moving image is input into the image processing apparatus 101 by the moving image input device 102 via the input unit 105. The input moving image is stored in a working memory of the storage unit 106.

Next, in step S202, the CPU sets a first frame of the moving image as a processing target frame. In step S203, the CPU sets a frame image extraction interval to one second. The frame image extraction interval is not limited to one second, and may be set to an interval so that each frame can be a processing target frame, or an initial value thereof may be set in a setting file.

Figure 3B:
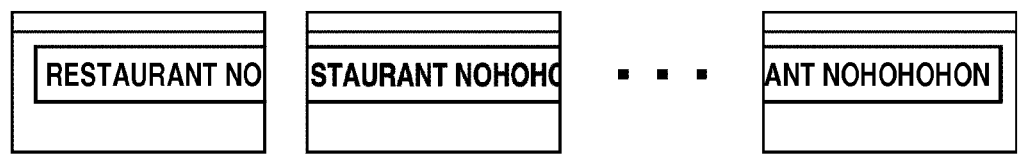
Figure 5B:
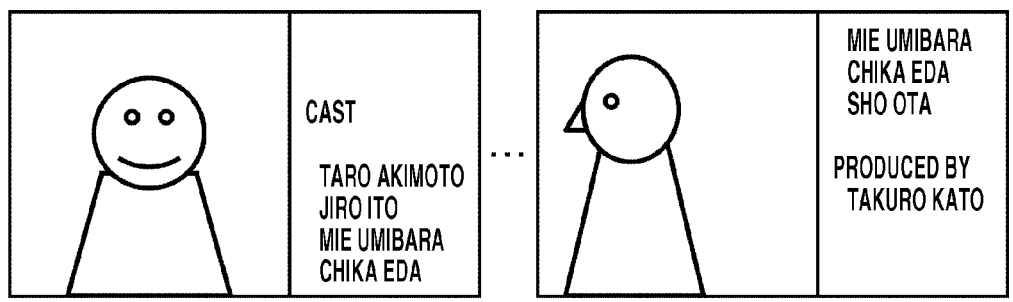

Next, in step S204, the frame image extraction unit 107 extracts a frame image handled as the processing target frame from the moving image. FIGS. 3B, 4B, and 5B illustrate examples in which a frame image has been extracted from a moving image.

Figure 3C:
Figure 5C:
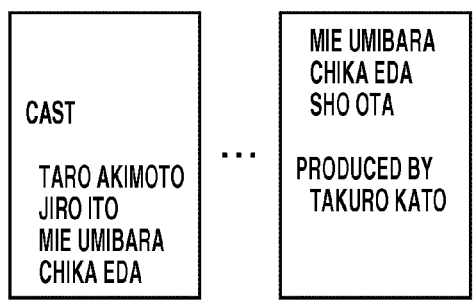

In step S205, the character area extraction unit 108 extracts a character area from the frame image. The character area extraction processing will be described in more detail with reference to a flowchart in FIG. 6. FIGS. 3C, 4C, and 5C illustrate examples in which a character area is extracted from a frame image.

Next, the processing in steps S206 to S211 is repeated for the number of character areas that are extracted in step S205. In step S207, the CPU determines whether there is a combination destination image (an already-combined image) for the image of the processing target character area. In this processing, the CPU determines whether an already-combined image can serve as the combination destination image, in other words, whether an already-combined image can be connected to an image of the processing target character area. The determination processing in step S207 will be described in more detail with reference to a flowchart in FIG. 8.

In step S207, if it is determined that there is no combination destination image (already-combined image) (NO in step S207), the processing proceeds to step S208. In step S208, the CPU sets so that the image of the processing target character area is newly considered as an already-combined image, and the processing proceeds to step S211. Since in step S208 the image of the processing target character area is considered as an already-combined image, the CPU determines whether an image of a character area of a next frame image after the frame image extraction interval can serve as a combination destination image. In step S207, if it is determined that there is a combination destination image (an already-combined image)

(YES in step S207), the processing proceeds to step S209. In step S209, the combined image generation unit 110 generates a combined image from the combination destination image and the image of the processing target character area. The image combination processing will be described in more detail with reference to a flowchart in FIG. 10.

Next, in step S210, frame image extraction interval candidates are calculated for determining the frame image to be the next processing target, and the processing then proceeds to step S211. The frame image extraction interval candidate calculation processing will be described in more detail with reference to a flowchart in FIG. 11. The frame image can also be extracted without performing the frame image extraction interval candidate calculation processing, by always using the frame image extraction interval set in step S203. In such a case, the processing performed in step S210 is unnecessary. In step S211, if the processing for all character areas in the frame has finished, the processing proceeds to step S212.

Next, in step S212, among the frame image extraction interval candidates calculated in step S210, the candidate that is the shortest is determined as the frame image extraction interval. In a case where the frame image is extracted without performing the frame image extraction interval candidate calculation processing by always using the frame image extraction interval set in step S203, the processing performed in step S212 is unnecessary.

Figure 3D:
Figure 5D:
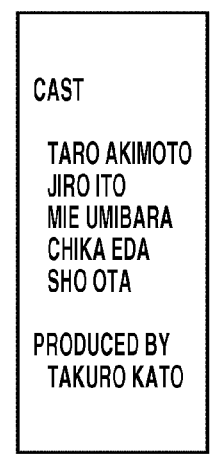

In step S213, the CPU sets the frame after the frame image extraction interval determined in step S212 as the processing target frame. In step S214, the CPU determines whether the processing target frame set in step S213 is before the last frame of the moving image. If it is determined that the processing target frame is before the last frame (YES in step S214), the processing returns to step S204. If it is determined that the processing target frame is past the last frame (NO in step S214), the processing proceeds to step S215. By performing the processing up to this point, generation of the combined image for all of the character areas is completed. FIGS. 3D, 4D, and 5D illustrate examples of character area combined images.

In step S215, a character area combined image is output to the image display device 103 via the output unit 112. In step S216, the character recognition unit 111 performs character recognition on the character area combined image. In step S217, the character recognition result is output to the character string display device 104 via the output unit 112.

<Details of Character Area Extraction Processing>

Figure 6:
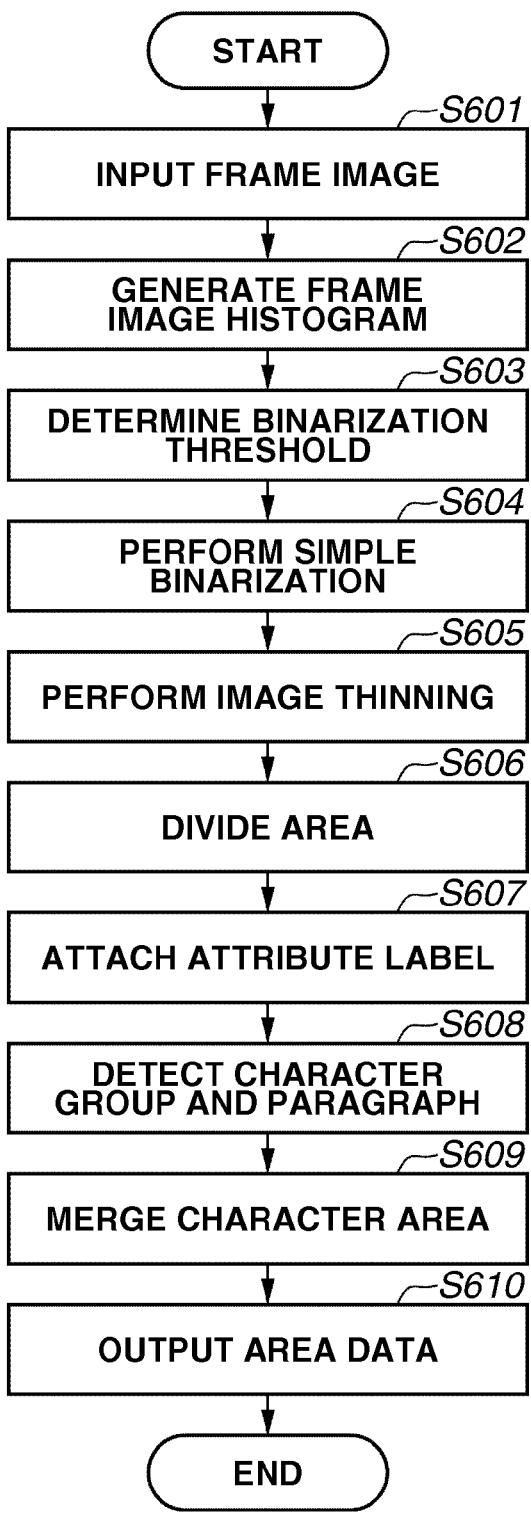
FIG. 6 is a flowchart illustrating a flow of character area extraction processing according to an exemplary embodiment of the present invention.

Next, an example of the character area extraction processing described in step S205 in FIG. 2 will be described in detail with reference to the flowchart in FIG. 6. The processing in the flowchart is realized by the CPU executing a control program.

First, in step S601, the CPU inputs the frame image to be a processing target into the working memory. In step S602, the frame image as the processing target is converted into a gray scale image, and histograms of luminance values of each pixel is generated. In step S603, a binarization threshold is determined by referring to the luminance histogram. In the determination of the binarization threshold, a conventional method can be employed that sets a binarization threshold by determining a minimum. A pre-set binarization threshold may also be used. Next, in step S604, the frame image is subjected to a simple binarization, so that a binarized image of the frame image is generated.

Next, in step S605, with m×n pixels set as one block, an image for area division is generated by representing that one block as one pixel value and thinning the input image. At this time, if at least one black pixel is present in the m×n pixels, those m×n pixels are represented by the single pixel value of black.

In step S606, area division is performed on all the pixels in the image for area division by regarding an area in which a predetermined number of black pixels are continuous in a vertical, horizontal, or diagonal direction as one area. During the area division, each area is labeled by numbering the areas in the detected order.

Next, in step S607, the areas are classified based on a width, height, and size of each area and a black pixel density in the areas, and are labeled with an attribute. Although the area attributes will be described in more detail with reference to FIG. 7, examples of the labels include "text", "table", "outer frame", "photographic image", "line image", and the like.

In step S608, the CPU calculates respective averages of the widths and the heights of all the areas with the label "text". If the obtained average width is greater than the obtained average height, the processing image is regarded as a horizontally written document, and if the reverse is the case, the processing image is regarded as a vertically written document. The character set is thus determined. At the same time, for a horizontally written document, the average height, and for a vertically written document, the average width, is set as the character size for one character.

Further, a column setting and a line spacing of the document are detected based on the luminance histograms of all the "text" areas in the vertical direction (for horizontal writing) or the horizontal direction (for vertical writing) on the image for area division. Then, in step S609, the "text" areas which discretely exist without any association at all are merged based on intervals with surrounding areas to form one unified area. Next, in step S610, the CPU outputs area data such as an attribute, and coordinates and a size of an original image for each area to the storage unit 106 and stores therein.

By performing the above-described processing, according to the present exemplary embodiment, area division processing of the frame image is performed, and area data of each area can be obtained. Regarding the character area extraction processing, a known method other than that described above may also be used.

Figure 7:
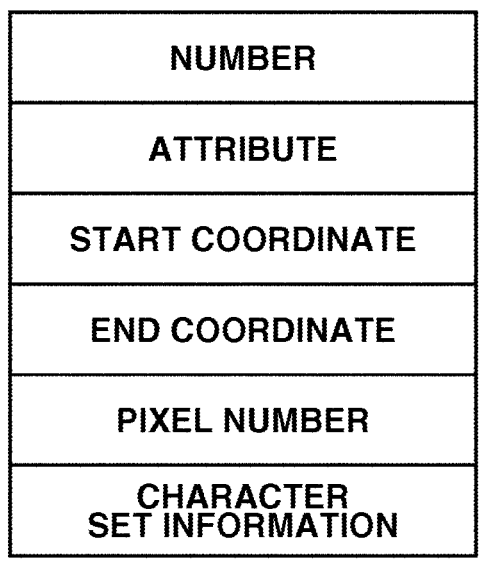
FIG. 7 illustrates an example of area data obtained by character area division processing according to an exemplary embodiment of the present invention.

FIG. 7 illustrates an example of the above-described area data. The respective area data items illustrated in FIG. 7 are described below.

"Number": represents a detection order of an area.

"Attribute": represents attribute information of an area, and the following five types of attribute are prepared.

"Text" indicates a character area.

"Table" indicates a table area.

"Outer frame" indicates a ruled line or other such area.

"Photographic image" indicates a photograph area.

"Line image" indicates a line image area.

"Start point coordinates": represents X-Y coordinates of an area start in an original image.

"End point coordinates": represents the X-Y coordinates of an area end in the original image.

"Pixel number": represents a total number of pixels in the area.

"Character set information": represents three types of character set information, that is, horizontally written, vertically written, and unknown.

As described above, area division processing is performed according to the present exemplary embodiment. However, the area data illustrated in FIG. 4 is merely one example of applying the present exemplary embodiment. For example, other information pieces may be appropriately added or removed according to an image processing apparatus.

<Details of the Processing to Determine Presence or Absence of Combination Destination Image>

Figure 8:
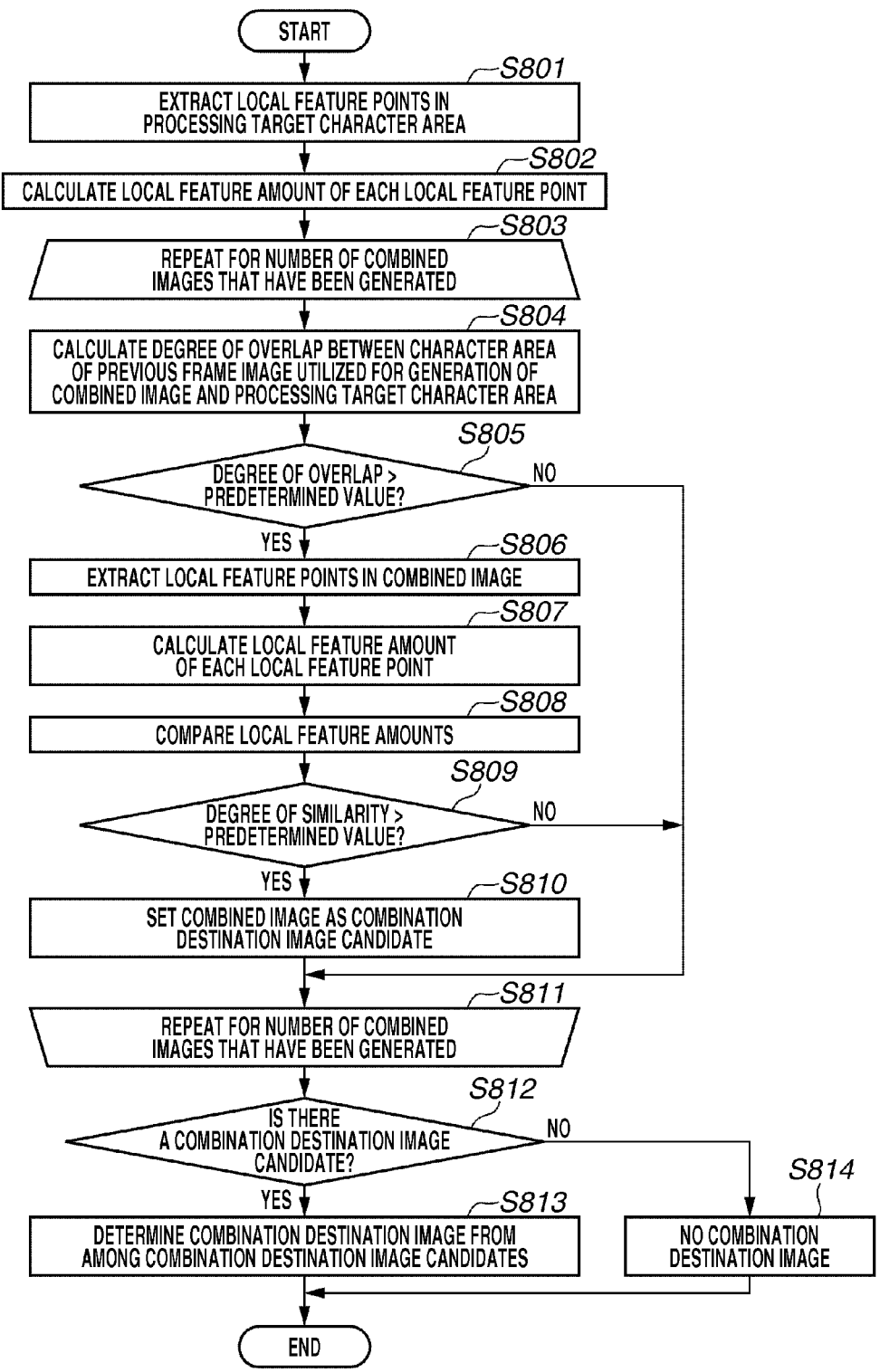
FIG. 8 is a flowchart illustrating a flow of processing to determine presence or absence of a combined image according to a first exemplary embodiment of the present invention.

Next, the processing to determine whether a combination destination image is present described in step S207 in FIG. 2 will be described with reference to the flowchart in FIG. 8. The processing in the flowchart is realized by the CPU executing a control program.

First, in step S801, the CPU extracts local feature points in the image of the processing target character area (refer to C. Harris and M. J. Stephens, "A combined corner and edge detector," In Alvey Vision Conference, pages 147 to 152, 1988). More specifically, pixel values of a pixel and its eight neighboring pixels (a total of nine pixels) in the image obtained by applying a Harris operator are checked. Then, a point where the pixel value is a local maximum (that is, a pixel having a maximum pixel value from among the nine pixels) is extracted as a local feature point. The method for extracting the feature point is not limited to the above-described feature point extraction method that is performed based on a Harris operator. Any feature point extraction method can be employed as long as the method can extract a local feature point.

Next, in step S802, based on each local feature point extracted in step S801 and surrounding image information, a local feature amount corresponding to each feature point is calculated (refer to David G. Lowe, "Distinctive Image Features from Scale-Invariant Keypoints," International Journal of Computer Vision, 60, 2 (2004), pp. 91 to 110). More specifically, a predetermined range around the local feature point is divided into four×four blocks (a total of 16 blocks), and histograms of oriented gradients in eight directions different from each other by 45 degrees is generated for each block. The feature vector in those 128 dimensions is taken as the local feature amount. The method for calculating the local feature amount is not limited to the above-described local feature amount calculation method. Any feature amount calculation method can be employed as long as the method can calculate a local feature amount.

In a method that utilizes a local feature amount, the local feature amount is defined as information formed from a plurality of elements which are constant in rotation and constant in enlargement and reduction. Consequently, even if the image is rotated, enlarged, or reduced, image comparison can be performed without being affected by (or minimizing the effects of) rotation or enlargement/reduction.

The local feature amount is generally represented as a vector. However, whether the local feature amount is invariant to rotation or to enlargement/reduction is a theoretical discussion. In an actual digital image, slight differences occur between the local feature amounts before and after rotation or enlargement/reduction processing of the image.

To calculate a local feature amount that is invariant to rotation, like in David G. Lowe, "Distinctive Image Features from Scale-Invariant Keypoints," International Journal of Computer Vision, 60, 2 (2004), pp. 91 to 110, for example, a main direction is calculated from a pixel pattern in a local area around a local feature point, and normalization of the direction is performed by rotating the local area based on the main area when the local feature amount is calculated.

Further, to calculate a local feature amount that is invariant to enlargement/reduction, images having different scales are generated internally, and extraction of local feature points and calculation of local feature amounts are each performed based on the respective scale images.

Figure 9:
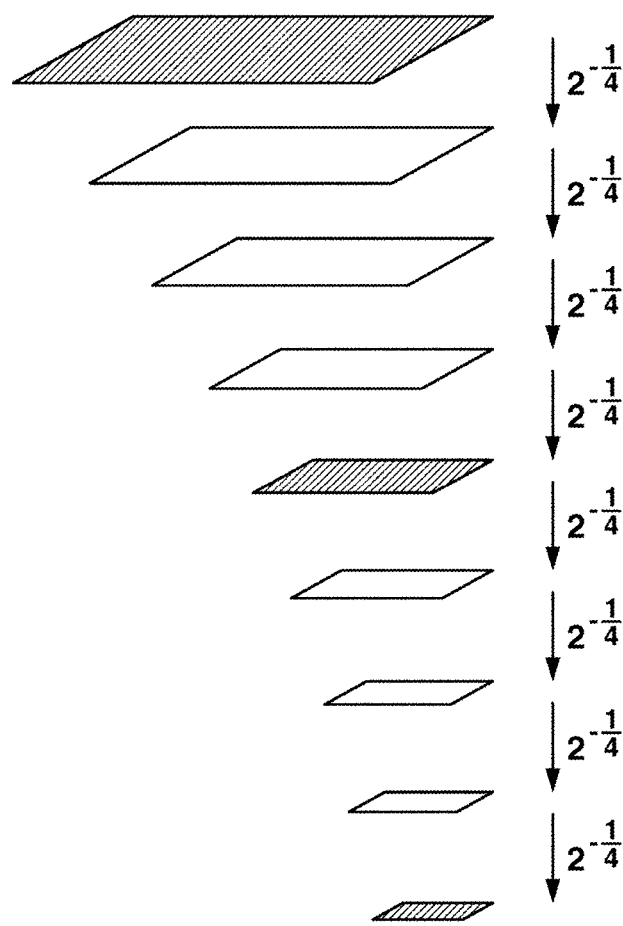
FIG. 9 illustrates an example of processing for generating a reduced image according to an exemplary embodiment of the present invention.

A set of internally generated images having a series of different scales is commonly referred to as a scale space. FIG. 9 illustrates an outline of such a scale space. For a feature amount of each feature point, a scale space is also stored in which a rotation angle and the feature amount are calculated when the direction is normalized.

Subsequently, the processing in steps S803 to S811 is repeated for the number of combined images that have already been generated. Accordingly, the CPU determines which already-combined image among the already-combined images that have been combined up to the previous frame the image of the character area in the current processing target frame should be combined.

In step S804, a degree of overlap in a positional relationship between the character area of the previous frame image that was utilized to generate the already-combined image and the current processing target character area is calculated based on the following formulae. Such calculation is performed because the character areas are likely to be present in roughly the same location in the frame.

$$\text{Area of overlap} = \max(0, \min(XR1, XR2) - \max(XL1, XL2)) \times \max(0, \min(YB1, YB2) - \max(YT1, YT2)) \quad (1)$$

$$\text{Area of previous frame target character area} = (XR1 - XL1) \times (YB1 - YT1) \quad (2)$$

$$\text{Area of current frame target character area} = (XR2 - XL2) \times (YB2 - YT2) \quad (3)$$

$$\text{Degree of overlap} = (\text{area of overlap}) / \min(\text{area of previous frame target character area, area of current frame target character area}) \quad (4)$$

Wherein, (XL1, YT1) and (XR1, YB1) are respectively the upper left and the lower right coordinates of the character area of the previous frame utilized to generate the combined image, and (XL2, YT2) and (XR2, YB2) are respectively the upper left and the lower right coordinates of the current processing target character area.

The calculation of the degree of overlap in the positional relationship is not limited to the above-described formulae. The calculation can also be performed without using the minimum value of the area of the previous frame target character area and the area of the current frame target character area as the denominator, by using either of these values as a fixed denominator. In addition, according to the present exemplary embodiment, although the degree of overlap is used as a geometric positional relationship, a geometric positional relationship can also be calculated by comparing the coordinates of the character areas.

Next, in step S805, the CPU compares whether the degree of overlap is greater than a predetermined value. If the degree of overlap is greater than the predetermined value (YES in step S805), the processing proceeds to step S806. If the degree of overlap is not greater than the predetermined value (NO in step S805), the processing proceeds to step S811. If the degree of overlap is greater than the predetermined value, this means that the character areas are present at roughly the same location in the frame. Therefore, there is a high likelihood that there is a combination destination image for the processing target character area. The predetermined value in this case may be, for example, 80%.

In step S806, local feature points in the already-combined image are extracted. The already-combined image is a merged image in which character areas have been combined. The local feature points may be extracted only from the image of the character area of the previous frame. The details of the local feature point extraction processing are similar to that in step S801. By storing the local feature points already extracted when the images are combined, the processing in step S806 may be omitted.

In step S807, the local feature amount for each local feature point extracted in step S806 is calculated. The local feature amount calculation processing is similar to that in step S802.

In step S808, a degree of similarity is calculated by comparing the feature amounts of the image of the character area of the previous frame image and of the image of the current processing target character area. The feature amounts of the already-combined image and of the image of the current processing target character area may also be compared. This is because, there is a possibility that if the image of the current processing target character area cannot be combined and merged since it is not similar to the image of the character area of the previous frame, the already-combined image may include a similar area. In a case where the moving image input device 102 is moved in one direction, the image of the current processing target character area is similar to the image of the character area of the previous frame. In a case where an image of the character area is captured while jiggling the moving image input device 102, moving the moving image input device 102 in the other direction, or zooming, the image of the current processing target character area is not similar to the image of the character area of the previous frame. Therefore, in the already-combined image, an area that is similar to the image of the current processing target character area is present.

Although there are various methods for checking an image based on comparisons of local feature points/local feature amounts, according to the present exemplary embodiment a method will be described that utilizes RANSAC (M. A. Fischer and R. C. Bolles, "Random sample consensus: A paradigm for model fitting with applications to image analysis and automated cartography," Commun. ACM, no. 24, vol. 6, pp. 381 to 395, June 1981).

First, the CPU searches for each local feature point in the image of the processing target character area and a local feature point (hereinbelow, "correspondence point") in the already-combined image at which the distance between features becomes minimum, and stores that pair (hereinbelow, "correspondence point pair").

Next, three local feature points are randomly selected from the image of the processing target character area. The correspondence points of these three local feature points are also extracted from the already-combined image. Then, an affine transformation matrix is determined based on the coordinates of these three correspondence point pairs.

Using the affine transformation matrix, the coordinates of the remaining local feature points in the image of the processing target character area are converted into the coordinates of the already-combined image. The CPU confirms whether an above-described correspondence point is present near those coordinates. If a correspondence point is present, the CPU adds a vote to a tally, and if a correspondence point is not present, the CPU does not add a vote to the tally. The degree of similarity is calculated by dividing the number of votes by the number of local feature points in the image of the processing target character area.

The above-described series of processes for calculating the degree of similarity by randomly selecting three local feature points from an image of the processing target character area is performed for a predetermined number of iterations. More specifically, affine transformation matrices equal to a predetermined number of iterations are generated, and the degree of similarity for when those affine transformation matrices are used is calculated.

Lastly, the degree of similarity determined to be the most similar is output as the degree of similarity between the image of the processing target character area and the already-combined image. Further, the affine transformation matrix at that time and an arbitrary one pair among the three pairs of correspondence points of the local feature points at which the distance between the features is a minimum are output.

Next, in step S809, the CPU compares whether the degree of similarity is greater than a predetermined value. If it is determined that the degree of similarity is greater than the predetermined value (i.e., that the image of the processing target character area and the combined image are similar) (YES in step S809), the processing proceeds to step S810. If it is determined that the degree of similarity is smaller than the predetermined value (NO in step S809), the processing proceeds to step S811. The predetermined value in this case may be, for example, 80%.

In step S810, the CPU sets the already-combined image utilized in the current determination as one of combination destination image candidates to be combined with the image of the processing target character area.

In step S811, when the processing has finished being repeated for the number of combined images that have been generated, the processing proceeds to step S812.

In step S812, the CPU determines whether there is a combination destination image candidate. If there is a combination destination image candidate (YES in step S812), the processing proceeds to step S813, and if there are no combination destination image candidates (NO in step S812), the processing proceeds to step S814.

In step S813, the CPU determines the candidate having the highest degree of similarity among the combination destination image candidates to be the combination destination image, and finishes the processing. The image of the processing target character area and the combination destination image are the combination target images to be combined. In step S814, the CPU determines that there is no combination destination image, and finishes the processing.

<Details of Image Combination Processing>

Figure 10:
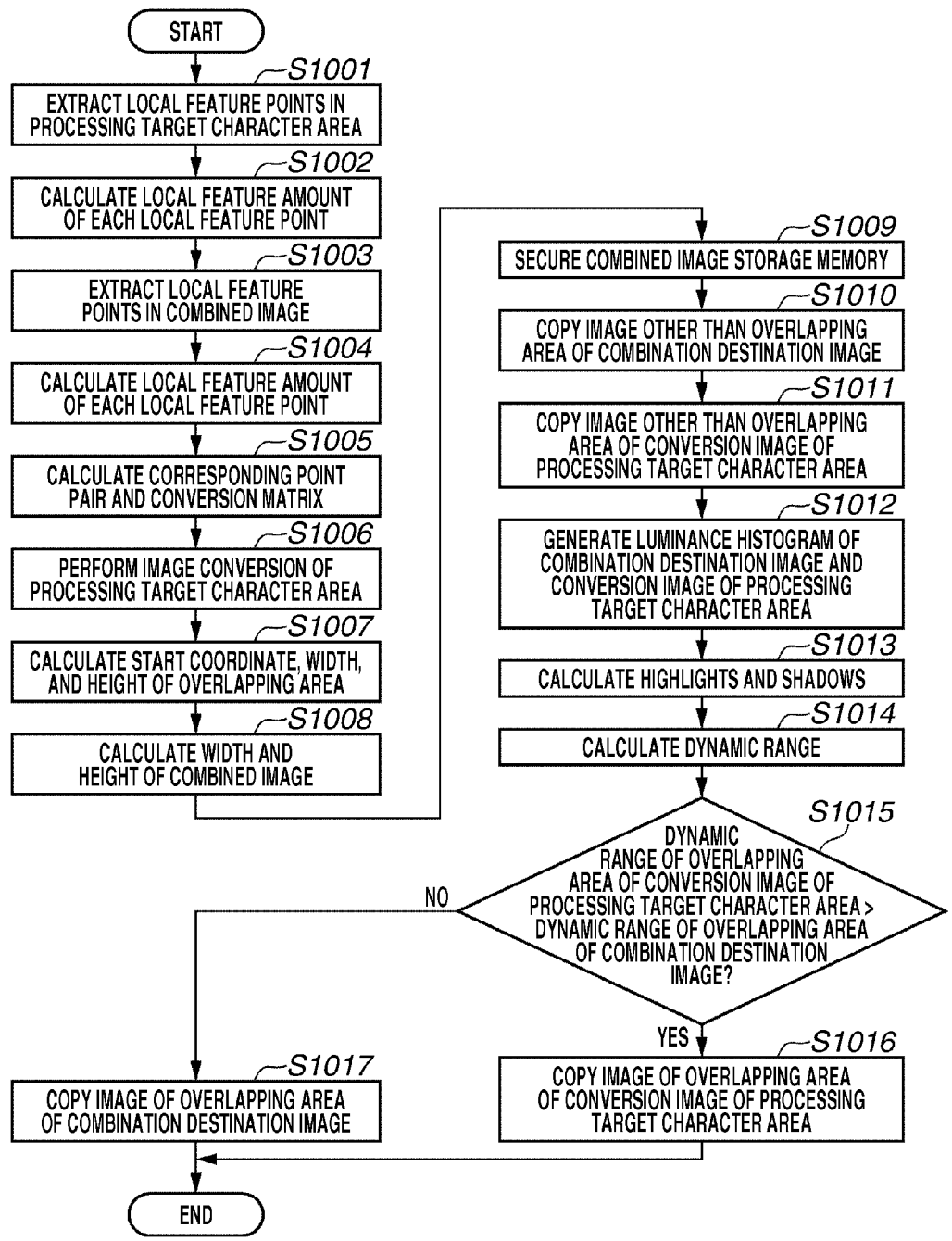
FIG. 10 is a flowchart illustrating a flow of image combination processing according to an exemplary embodiment of the present invention.

Next, an example of the image combination processing described in step S209 in FIG. 2 will be described with reference to the flowchart in FIG. 10. The processing in the flowchart is realized by the CPU executing a control program.

First, in step S1001, the CPU extracts the local feature points in the image of the processing target character area. This processing is the same as the processing to extract the local feature points in the image of the processing target character area performed in step S801 in FIG. 8. Next, in step S1002, the CPU calculates a local feature amount of each local feature point in the image of the processing target character area. This processing is the same as the processing to calculate the local feature amount of each local feature point in the image of the processing target character area performed in step S802 in FIG. 8.

In step S1003, the local feature points in the combination destination image are extracted. This processing is the same as the processing to extract the local feature points in the combination destination image performed in step S806 in FIG. 8. Next, in step S1004, the CPU calculates the local feature amount of each local feature point in the combination destination image. This processing is the same as the processing to calculate the local feature amount of each local feature point in the combination destination image performed in step S807 in FIG. 8. In steps S1003 and S1004, the local feature points and the local feature amounts may be determined only from the image of the character area of the previous frame. By storing the local feature points and the local feature amounts that were used in the processing to determine the presence or absence of a combination destination image, the processing in steps S1001 to S1004 can be omitted.

Next, in step S1005, the CPU calculates the correspondence point pairs and the transformation matrix for combining two images. For the correspondence point pair and transformation matrix calculation processing, the processing similar to that in step S808 is performed. The correspondence point pair is a correspondence point pair of local feature points at which the distance between features output by the processing to calculate the degree of similarity of two images becomes a minimum. The transformation matrix is an affine transformation matrix output by the same processing as performed in step S808. If a transformation matrix has already been determined in step S808, the same affine transformation matrix is used.

In step S1006, the CPU converts the image of the processing target character area using the transformation matrix obtained in step S1005. Based on this processing, the conversion image of the processing target character area has the same horizontal/vertical and enlargement/reduction ratio as the combination destination image.

In step S1007, using the correspondence point pairs obtained in step S1005, the CPU obtains the start point coordinates, the width, and the height for each image of the overlapping area between the conversion image of the processing target character area and the combination destination image. If the start point coordinates of the overlapping area image of the combination destination image is (Xad, Yad), the start point coordinates of the overlapping area of the conversion image of the processing target character area is (Xbd, Ybd), the width of the overlapping area is Wd, and the height of the overlapping area is Hd, the start point coordinates, the width, and the height can be calculated based on the following formulae.

$$Xad = Xa1 - \min(Xa1, Xb1) \quad (5)$$

$$Xbd = Xb1 - \min(Xa1, Xb1) \quad (6)$$

$$Wd = \min(Wa - Xad, Wb - Xbd) \quad (7)$$

$$Yad = Ya1 - \min(Ya1, Yb1) \quad (8)$$

$$Ybd = Yb1 - \min(Ya1, Yb1) \quad (9)$$

$$Hd = \min(Ha - Yad, Hb - Ybd) \quad (10)$$

Wherein (Xa1, Ya1) are the coordinates of the combination destination image of the correspondence point pairs, and (Xb1, Yb1) are the coordinates of the conversion image of the processing target character area of the correspondence point pairs. Wa and Ha are the width and the height, respectively, of the combination destination image, and Wb and Hb are the width and the height, respectively, of the conversion image of the processing target character area.

In step S1008, the size of the image after the combination, that is the width Wc and the height Hc are calculated based on the following formulae.

$$Wc = \max(Xa1, Xb1) + \max(Wa - Xa1, Wb - Xb1) \quad (11)$$

$$Hc = \max(Ya1, Yb1) + \max(Ha - Ya1, Hb - Yb1) \quad (12)$$

Wherein (Xa1, Ya1) are the coordinates of the combination destination image of the correspondence point pairs, and (Xb1, Yb1) are the coordinates of the conversion image of the processing target character area of the correspondence point pairs. Wa and Ha are the width and the height, respectively, of the combination destination image, and Wb and Hb are the width and the height, respectively, of the conversion image of the processing target character area.

In step S1009, the CPU secures a memory for storing the image after the combination. In step S1010, the CPU copies the image other than the overlapping area of the combination destination image to the memory for the image after the combination. In step S1011, the CPU copies the image other than the overlapping area of the conversion image of the processing target character area to the memory for the image after the combination.

Next, in step S1012, the CPU generates a luminance histogram of the overlapping area from the combination destination image and the conversion image of the processing target character area. In step S1013, the CPU obtains a highlight point and a shadow point in each luminance histogram. The minimum luminance in a luminance range in which a predetermined ratio (e.g., 5%) of pixels from the maximum luminance is included is set as the highlight point. The maximum luminance in a luminance range in which a predetermined ratio (e.g., 5%) of pixels from the minimum luminance is included is set as the shadow point.

In step S1014, the CPU obtains a dynamic range of each overlapping area by calculating the difference between the highlight point and the shadow point of each overlapping area.

In step S1015, the CPU compares the dynamic range of the overlapping area of the conversion image of the processing target character area and the dynamic range of the overlapping area of the combination destination image. If the dynamic range of the overlapping area of the conversion image of the processing target character area is greater than the dynamic range of the overlapping area of the combination destination image (YES in step S1015), the processing proceeds to step S1016. In step S1016, the CPU copies an image of the overlapping area of the conversion image of the processing target character area to the memory for the image after the combination, and then finishes the processing. If the dynamic range of the overlapping area of the combination destination image is greater (NO in step S1015), the processing proceeds to step S1017. In step S1017, the CPU copies an image of the overlapping area of the combination destination image to the memory for the image after the combination, and then finishes the processing. By using the image having the larger dynamic range to perform image combination, separation becomes easier because a difference in shading between the character portion and background portion increases. Consequently, the accuracy of the character recognition performed in step S216 can be improved.

According to the present exemplary embodiment, although the dynamic range of an overlapping area of the combination destination image and the conversion image of the processing target character area are compared, the comparison can also be performed using the dynamic range of the whole combination destination image, or using the dynamic range of the whole conversion image of the processing target character area. Further, the dynamic range comparison may be performed only in a case where the dynamic range of the combination destination image is smaller than a predetermined value. The dynamic range of the combination destination image in this case may be the dynamic range of the whole combination destination image, or the dynamic range of the overlapping area between the conversion image of the processing target character area and the combination destination image. Moreover, the present exemplary embodiment may be configured to use the already-combined image as it is without performing a dynamic range comparison and to copy and use only a portion which is not overlapped from the conversion image of the processing target character area.

<Details of Frame Image Extraction Interval Candidate Calculation Processing>

Figure 11:
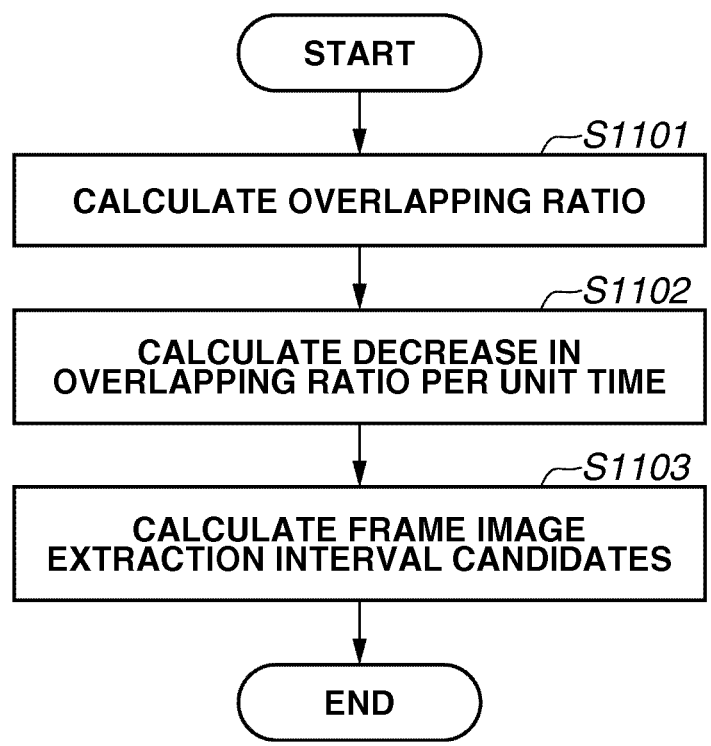
FIG. 11 is a flowchart illustrating a flow of frame image extraction interval candidate calculation processing according to an exemplary embodiment of the present invention.

Next, an example of the frame image extraction interval candidate calculation processing performed in step S210 in FIG. 2 will be described with reference to the flowchart in FIG. 11. The processing in the flowchart is realized by the CPU executing a control program.

When two images are combined, unless a certain level of areas are overlapped, the images cannot be correctly combined. If a frame image extraction interval is narrowed, although the ratio of overlap increases which makes combination easier, the number of times that the combination processing is performed increases, so that the a long processing time is required. On the other hand, if the frame image extraction interval is widen, although the number of times that the combination processing is performed decreases, the ratio of overlap decreases, so that image combination cannot be performed in some cases.

Therefore, it is desirable to set the frame image extraction interval so that combination processing can be performed and the number of times that the combination processing is performed is as small as possible. The present processing is pre-processing for dynamically setting the frame image extraction interval. The frame image extraction interval is widened and narrowed as appropriate.

First, in step S1101, a ratio (overlapping ratio) of the area of the overlapping area between the conversion image of the processing target character area and the combination destination image to the area of the conversion image of the processing target character area is calculated. The overlapping ratio is calculated based on the following formula.

Overlapping ratio=Area of the overlapping area/Area of the conversion image of the processing target character area (13)

Next, in step S1102, how much the overlapping ratio has decreased per unit time is calculated. An average overlap decrease ratio per unit time is calculated based on the following formula.

Average overlap decrease ratio per unit time=(1−Overlapping percentage)/Current frame image extraction interval (14)

Next, in step S1103, the frame image extraction interval candidate is calculated. The frame image extraction interval candidate is calculated based on the following formula using an overlapping ratio (required overlapping ratio) that is as small as possible yet still allows combination processing to be performed. The required overlapping ratio is not the absolute minimum overlapping ratio at which combination processing can be performed, a certain margin is added in.

Frame image extraction interval candidate=(1−Required overlapping ratio)/Average overlap decrease ratio per unit time (15)

As described above in the first exemplary embodiment, an image processing apparatus is capable of extracting a character area from a moving image. According to the first exemplary embodiment, since character area images extracted from frame images of a moving image are combined, even if characters appear across a plurality of frames and a whole character string cannot be extracted from a single frame image of the moving image, the whole character string can be extracted by efficiently merging the characters.

Figure 12:
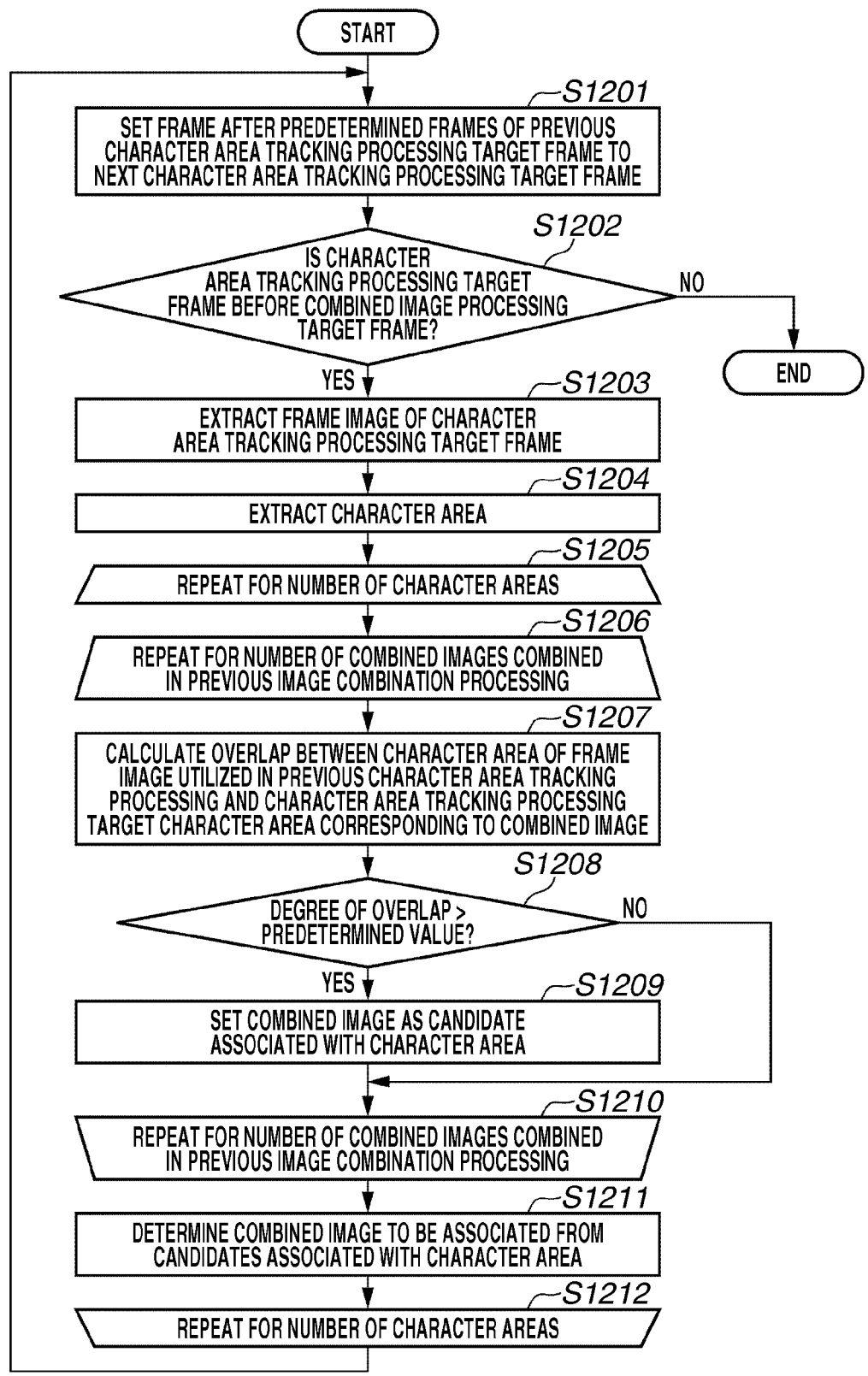
FIG. 12 is a flowchart illustrating a flow of character area tracking processing according to a second exemplary embodiment of the present invention.

According to the first exemplary embodiment, a degree of overlap of character areas and a degree of similarity of local feature amounts are used in processing to determine the presence or absence of a combination destination image. However, rather than using both the degree of overlap and the degree of similarity, the processing can also be performed using only the degree of overlap of the character areas. In this case, character area tracking processing illustrated in a flowchart in FIG. 12 is performed between the processing in step S213 and the processing in step S214 in FIG. 2. When the processing illustrated in FIG. 12 is finished, the processing proceeds to step S214.

Sometimes, a character area including a completely different character string can suddenly appear at roughly the same location in a different frame image by accident because the moving image input device 102 is not moved horizontally or vertically. As described in a second exemplary embodiment, if the processing to determine the presence or absence of a combination destination image is performed using just the degree of overlap of the positional relationship of the character areas, the processing needs to be designed so as not to mistakenly determine such a completely different character string as a combination destination image. Therefore, processing is performed that tracks whether the positional relationship between character areas in different frame images continuously overlaps. The character area tracking processing is performed in shorter intervals than the frame image extraction interval determined in step S212.

The system configuration that includes an image processing apparatus according to the second exemplary embodiment is the same as the configuration illustrated in FIG. 1. The processing in the flowchart is realized by the CPU executing a control program.

In step S1201 in FIG. 12, a frame which is a predetermined number of frames after the processing target frame on which the character area tracking processing has been previous executed is set as a next processing target frame for the character area tracking processing. The predetermined number of frames is set as an interval that is shorter than the frame image extraction interval determined in step S212 in FIG. 2. Next, in step S1202, the CPU determines whether the character area tracking processing target frame is before a frame extracted based on the frame image extraction interval determined in step S212 (hereinbelow, "image combination processing target frame"). If it is determined that the character area tracking processing target frame is before the image combination processing target frame (YES in step S1202), the processing proceeds to step S1203. If it is determined that the character area tracking processing target frame is after the image combination processing target frame (NO in step S1202), the character area tracking processing is finished.

Figure 2:
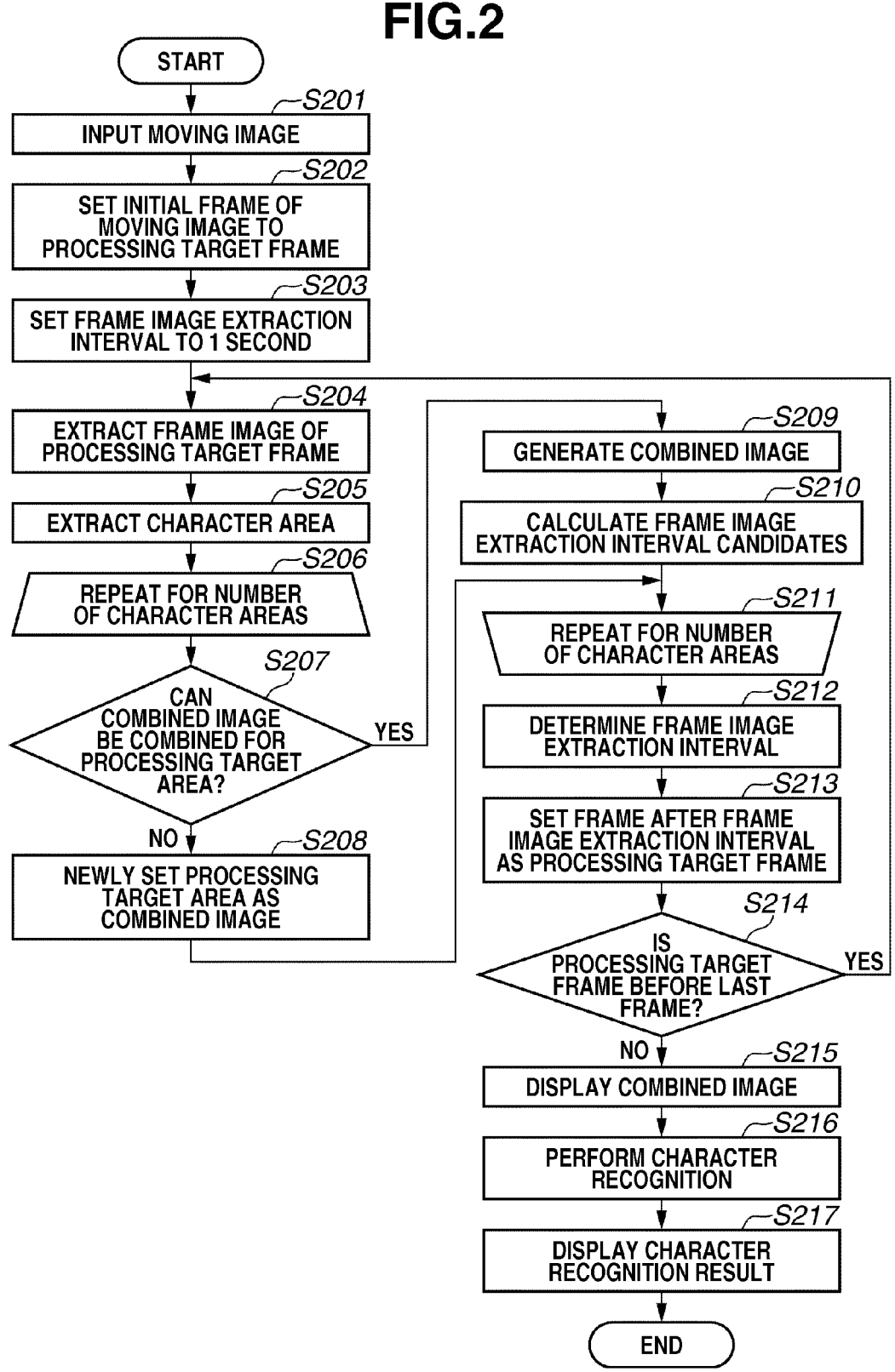
FIG. 2 is a flowchart illustrating a flow of image processing according to an exemplary embodiment of the present invention.

The processing in steps S1203 and S1204 is the same as the processing in steps S204 and S205 in FIG. 2.

Next, the processing in steps S1205 to S1212 is repeated for the number of character areas that are extracted in step S1204. Further, the processing in steps S1205 to S1210 is repeated for the number of already-combined images that have been combined in the previous image combination processing.

In step S1207, the CPU calculates the degree of overlap of the positional relationship between the character area of the frame image that is associated with the already-combined image and has been utilized in the execution of the previous character area tracking processing and the character area of the processing target frame image of the tracking processing target character area. The method for calculating the degree of overlap of the positional relationship is similar to that in step S804. To be associated with the already-combined image means that it has been confirmed that the positional relationship continuously overlaps with the already-combined image.

In step S1208, the CPU compares whether the degree of overlap of the positional relationship is greater than a predetermined value. If the degree of overlap is greater than the predetermined value (YES in step S1208), the processing proceeds to step S1209. If the degree of overlap is not greater than the predetermined value (NO in step S1208), the processing proceeds to step S1210. The predetermined value in this case may be, for example, 80%. If the degree of overlap of the positional relationship is greater than the predetermined value, this means that the positional relationship of character areas in different frames continuously overlaps.

In step S1209, the already-combined image utilized in the current determination is set as one of the candidates to be associated with the image of the character area of the processing target frame image.

In step S1210, after the repeat processing has finished, the processing proceeds to step S1211.

In step S1211, the already-combined image candidate having the highest degree of overlap among the combined image candidates associated with the character area is associated with the processing target character area by the current repeat processing, and stored.

In step S1212, after the processing has finished being repeated for the number of character areas, the processing returns to step S1201.

According to the second exemplary embodiment, in step S207 in FIG. 2, if the already-combined image and the character area of the processing target frame image are associated with each other by the processing in the flowchart illustrated in FIG. 12, the CPU determines that the character area of the processing target frame image can be combined with the already-combined image.

In addition, the image combination processing is executed without omitting the processing in steps S1003 and S1004. This is because in the processing to determine the presence or absence of a combination destination image, the local feature points and the local feature amounts are not calculated.

Figure 13:
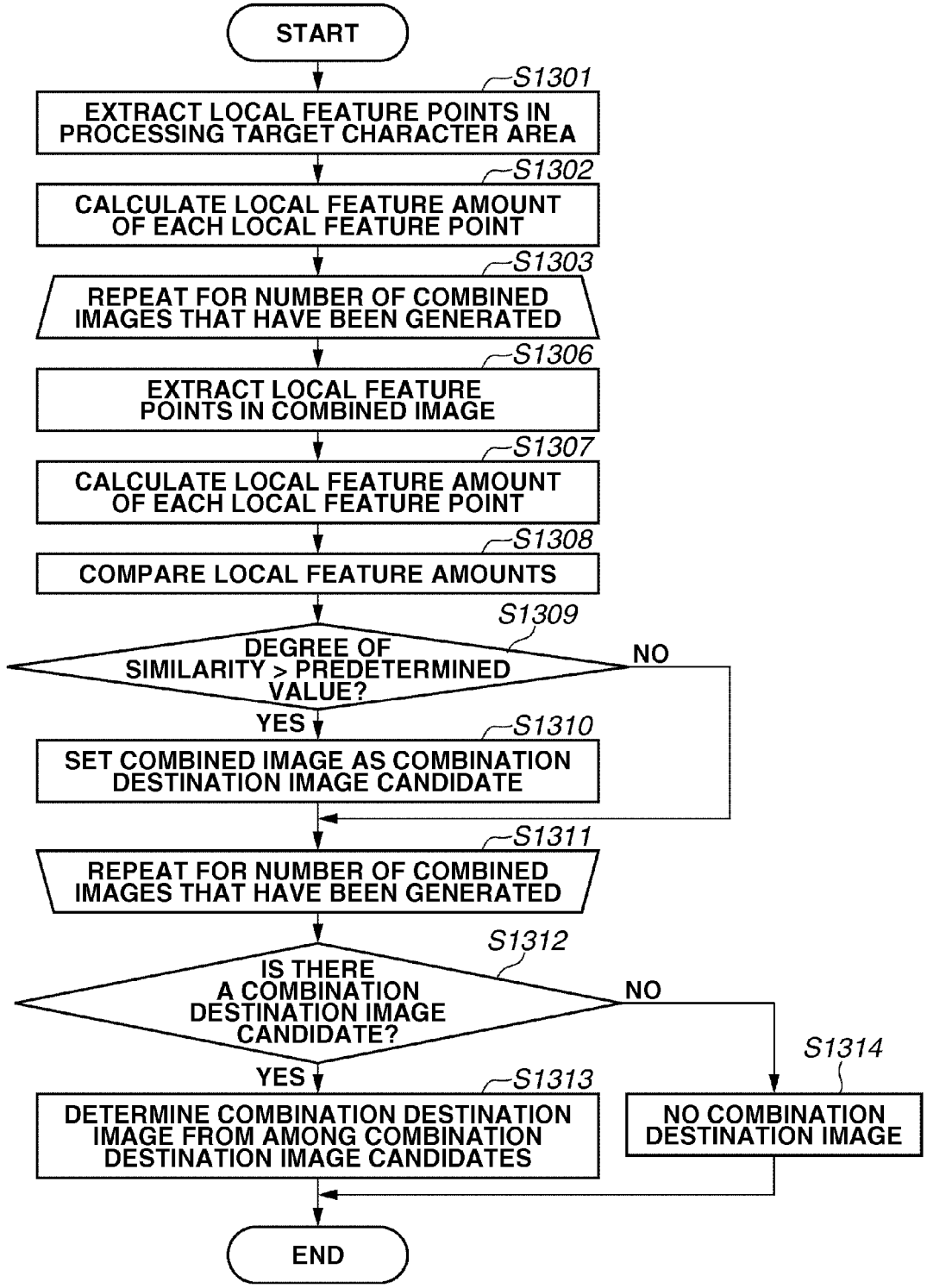
FIG. 13 is a flowchart illustrating a flow of processing to determine presence or absence of a combined image according to a third exemplary embodiment of the present invention.

According to the first exemplary embodiment, a degree of overlap of character areas and a degree of similarity of local feature amounts are used in processing to determine the presence or absence of a combination destination image. Further, according to the second exemplary embodiment, although just the degree of overlap of the character area is used, the processing can also be performed using just the degree of similarity of the local feature amounts. In this case, a processing procedure to determine the presence or absence of a combination destination image is performed based on a flowchart illustrated in FIG. 13.

The system configuration that includes an image processing apparatus according to a third exemplary embodiment is the same as the configuration illustrated in FIG. 1. The processing in the flowchart is realized by the CPU executing a control program.

The processing in steps S1301 to 1303 is the same that in steps S801 to S803. Further, the processing in steps S1306 to 1314 is the same as that in steps S806 to S814.

The present invention can be implemented as, for example, a system, an apparatus, a method, a program, a storage medium, and the like. More specifically, the present invention may be applied in a system configured from a plurality of devices, or in an apparatus configured from a single device.

Accordingly, the exemplary embodiments of the present invention can efficiently connect character area images extracted from different images and combine them.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-127143 filed Jun. 4, 2012, which is hereby incorporated by reference herein in its entirety.

What is claimed is:

1. An image processing apparatus comprising:
an extraction unit configured to extract one or more character area images from an image;
a determination unit configured to determine a pair of character area images to be a combination target based on a degree of similarity of an image feature in each character area image extracted by the extraction unit from different images; and
a combination unit configured to combine the determined pair of character area images to form a combined character area image, wherein the combination unit is configured to compare a dynamic range of each overlapping area image and combine using the overlapping area image having the larger dynamic range.

2. The image processing apparatus according to claim 1, wherein the determination unit is configured to determine a pair of character area images to be a combination target based on a degree of similarity between a character area image extracted by the extraction unit and a character area image that has already been combined.

3. The image processing apparatus according to claim 1, further comprising a display unit configured to display the combined character area image.

4. The image processing apparatus according to claim 1, further comprising a character recognition unit configured to perform character recognition on the combined character area image.

5. The image processing apparatus according to claim 1, wherein the character recognition unit is configured to perform character recognition on the character area having the larger dynamic range.

6. The image processing apparatus according to claim 2, wherein the combination unit is configured to, in a case where a dynamic range of a character area image that has already been combined is lower than a predetermined threshold, compare a dynamic range of each overlapping area image, and combine using the overlapping area image having the larger dynamic range.

7. The image processing apparatus according to claim 1, wherein the degree of similarity is obtained using a feature point obtained by applying a Harris operator and a feature amount corresponding to the feature point.

8. The image processing apparatus according to claim 1, wherein the extraction unit is configured to extract a character area based on a black pixel density in an area in which black pixels of a binarized image of the image are continuous.

9. The image processing apparatus according to claim 1, wherein the image is a frame image of a moving image.

10. The image processing apparatus according to claim 9, wherein the different image is a different frame image.

11. The image processing apparatus according to claim 10, further comprising a setting unit configured to set an interval that the extraction unit extracts the different frame image to an interval in which an overlapping area image is present in each character area image extracted by the extraction unit from a different image.

12. The image processing apparatus according to claim 10, further comprising a setting unit configured to set an interval that the extraction unit extracts the different frame image so that an overlapping ratio calculated from an area of an overlapping area image is a predetermined overlapping ratio.

13. The image processing apparatus according to claim 12, wherein the setting unit is configured to set an interval for extracting the different frame image according to a change in the overlapping ratio.

14. An image processing apparatus comprising:
an extraction unit configured to extract one or more character area images from an image;
a determination unit configured to determine a pair of character area images to be a combination target based on a position of each character area image extracted by the extraction unit from different images; and
a combination unit configured to connect and combine overlapping area images, that are the determined pair of character area images and that have a similar image feature amount, to form a combined character area image, wherein the combination unit is configured to compare a dynamic range of each overlapping area image and combine using the overlapping area image having the larger dynamic range.

15. A method for processing an image, the method comprising:
extracting one or more character area images from an image;
determining a pair of character area images to be a combination target based on a degree of similarity of an image feature in each character area image extracted from different images; and
combining the determined pair of character area images to form a combined character area image, wherein the combining compares a dynamic range of each overlapping area image and combines using the overlapping area image having the larger dynamic range.

16. A method for processing an image, the method comprising:
extracting one or more character area images from an image;
determining a pair of character area images to be a combination target based on a position of each character area image extracted from different images; and
connecting and combining overlapping area images, that are the determined pair of character area images and that have a similar image feature amount, to form a combined character area image, wherein the connecting and combining compares a dynamic range of each overlapping area image and combines using the overlapping area image having the larger dynamic range.

17. A computer-readable non-transitory medium that stores a program executable by a computer, the program for causing the computer to function as:
an extraction unit configured to extract one or more character area images from an image;
a determination unit configured to determine a pair of character area images to be a combination target based on a degree of similarity of an image feature in each character area image extracted by the extraction unit from different images; and
a combination unit configured to combine the determined pair of character area images to form a combined character area image, wherein the combination unit is configured to compare a dynamic range of each overlapping area image and combine using the overlapping area image having the larger dynamic range.

18. A computer-readable non-transitory medium that stores a program executable by a computer, the program for causing the computer to function as:
an extraction unit configured to extract one or more character area images from an image;
a determination unit configured to determine a pair of character area images to be a combination target based on a position of each character area image extracted by the extraction unit from different images; and
a combination unit configured to connect and combine overlapping area images, that are the determined pair of character area images and that have a similar image feature amount, to form a combined character area image, wherein the combination unit is configured to compare a dynamic range of each overlapping area image and combine using the overlapping area image having the larger dynamic range.

* * * * *